Dec. 3, 1940.  J. S. REID  2,223,459

COMBINATION THERMOPLASTIC WINDOW FRAME AND WEATHER SEAL

Filed March 16, 1938  3 Sheets-Sheet 1

INVENTOR.
JAMES S. REID
BY
HIS ATTORNEY.

Dec. 3, 1940.   J. S. REID   2,223,459
COMBINATION THERMOPLASTIC WINDOW FRAME AND WEATHER SEAL
Filed March 16, 1938   3 Sheets-Sheet 2

INVENTOR.
JAMES S. REID
BY
HIS ATTORNEY.

Dec. 3, 1940.  J. S. REID  2,223,459
COMBINATION THERMOPLASTIC WINDOW FRAME AND WEATHER SEAL
Filed March 16, 1938   3 Sheets-Sheet 3
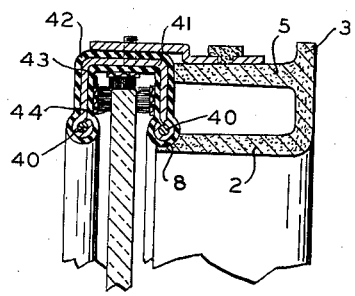
Fig. 11
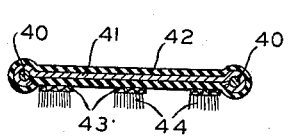
Fig. 12
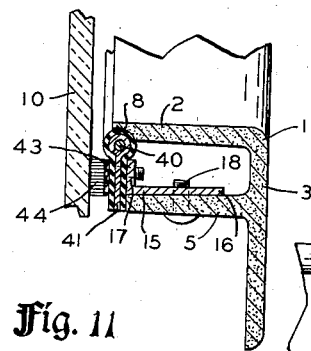
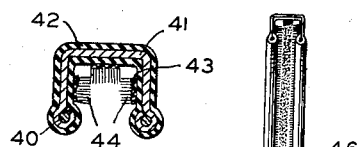
Fig. 13
Fig. 14  Fig. 16
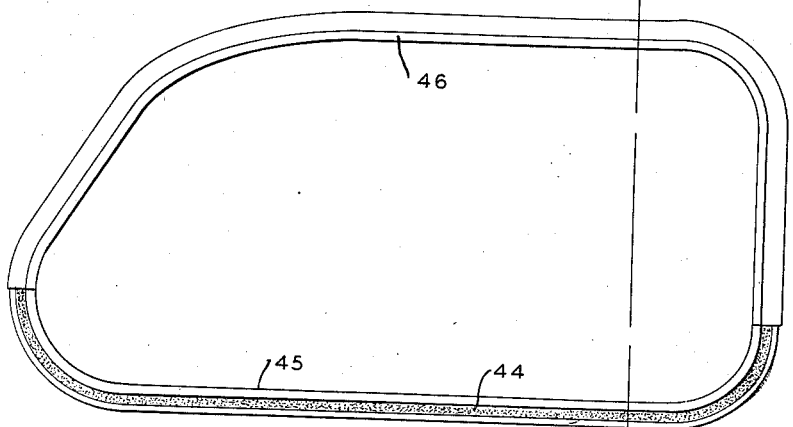
Fig. 15
INVENTOR.
JAMES S. REID
BY
HIS ATTORNEY.

Patented Dec. 3, 1940

2,223,459

UNITED STATES PATENT OFFICE 2,223,459

COMBINATION THERMOPLASTIC WINDOW FRAME AND WEATHER SEAL

James S. Reid, Shaker Heights, Ohio, assignor, by mesne assignments, to The Standard Products Company, Port Clinton, Ohio, a corporation of Ohio Application March 16, 1938, Serial No. 196,189

4 Claims. (Cl. 296—44)

This invention relates to an improvement in a decorative thermoplastic trim member for finishing the walls defining a window opening, in combination with a weather strip for sealing the space between the trim member and the window glass.

A preferred embodiment of the invention discloses a unitary, jointless, molded and decorative frame member of thermoplastic material of a size and shape which will cover and conceal the unfinished surfaces adjacent the window opening of an automobile door together with a conveniently shapable weather sealing medium mounted on and extending entirely around the frame, the weather sealing medium having a portion contacting the surface of the window glass in a manner to provide an airtight seal between the glass and the molded frame member.

An important obect of the invention lies in the provision of an inexpensive one-piece molded decorative frame member of thermoplastic material which is designed to be applied to the unfinished surface of a window opening so that one edge of the frame lies in close, uniform spaced relation from the surface of the window glass and a weather sealing strip mounted on the said edge and the surface of the window, whereby to provide a tight seal between the glass and the frame member.

An equally important object is to provide a thermoplastic window frame member having an attractive, durable finish in combination with a weather seal which is designed to be mounted on the frame, the frame providing a finish trim around the window opening of an automobile door, and the weather seal providing an efficient and airtight sliding surface between the frame member and the window glass.

Another important object is to provide a complete frame structure of thermoplastic molded material which is attractive in appearance and requires no subsequent welding operation, or painting and which eliminates numerous forming operations in combination with an efficient weather seal between the window glass and the frame.

A specific object is to provide an inexpensive, unitary thin wall frame structure for a window opening in an automobile, which is molded from a relatively expensive thermoplastic material and which will remain attractive in appearance over long periods of time.

Another specific object is to provide a decorative frame member of thermoplastic material for window openings and the like and a weather seal mounted on the frame member so that the frame member and weather seal may be mounted as a unit around the unfinished window opening.

Other objects and advantages will become apparent from a consideration of the following specification and accompanying drawings. In the drawings.

Figure 1:
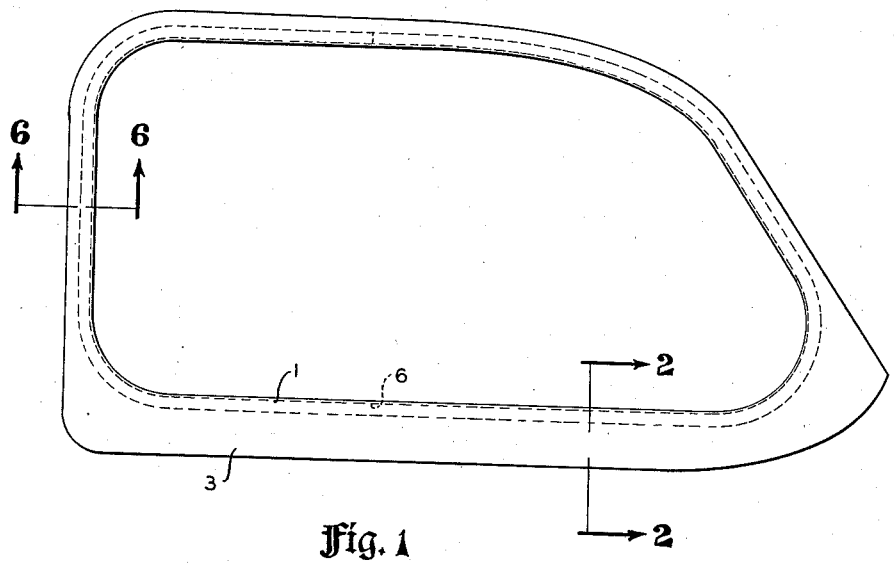
Fig. 1 is a plan view of one form of molded thermoplastic frame as viewed from the interior of the automobile door.
Figure 2:
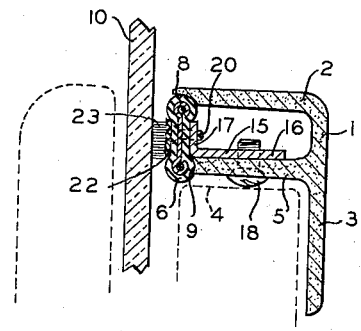
Fig. 2 is an enlarged fragmentary sectional view through the frame member, the dotted lines indicating the unfinished surface of the window opening and is taken substantially along the line 2—2 of Fig. 1.
Figure 3:
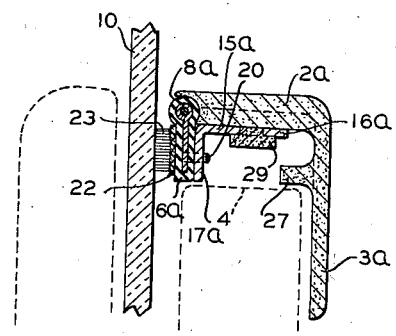
Figure 4:
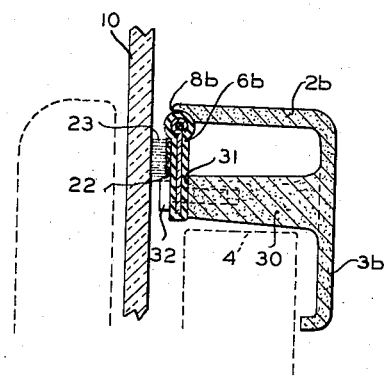
Figure 5:
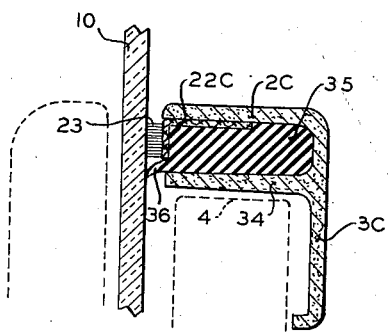
Figure 6:
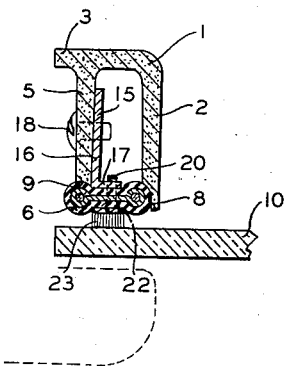
Figure 8:
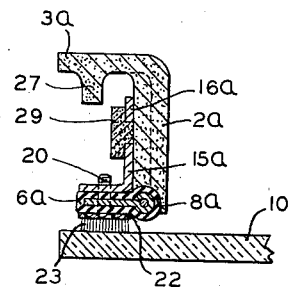
Figure 7:
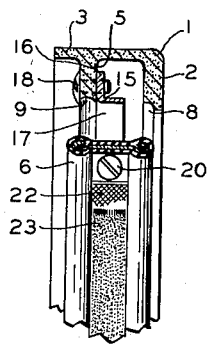
Figure 9:
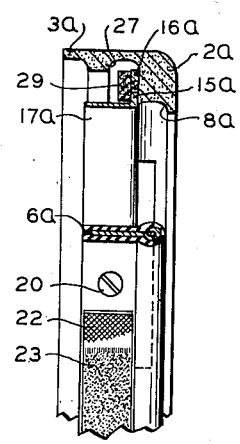
Figure 10:
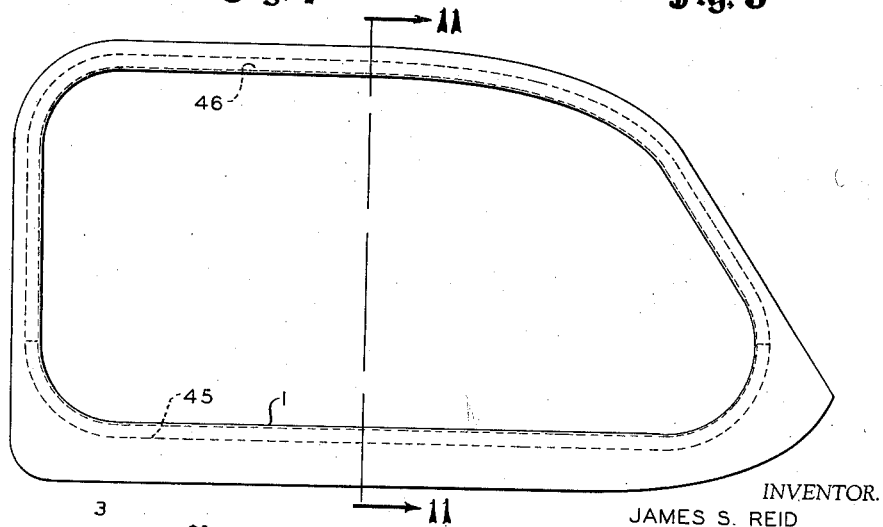

Figs. 3, 4, and 5 are views similar to Fig. 2 showing modifications of various cross sections of the frame and different sealing media;

Fig. 6 is an enlarged fragmentary sectional view through one of the vertical sides of the frame and is taken substantially along the line 6—6 of Fig. 1;

Fig. 7 is a fragmentary elevation, partly in section, of the frame member and weather sealing strip assembly as viewed from the exterior of the door;

Fig. 8 is a view similar to Fig. 6 of the frame represented in Fig. 3;

Fig. 9 is a fragmentary elevation of the frame in Fig. 8 as viewed from the exterior of the frame;

Fig. 10 is an elevation of the molded frame structure with a different weather seal indicated in dotted lines mounted on the reverse side of the frame;

Fig. 11 is an enlarged fragmentary sectional view taken substantially along the plane indicated by the line 11—11 of Fig. 10;

Figs. 12 and 13 are sectional views of the weather strip employed in the structure shown in Figs. 10 and 11;

Fig. 14 is a fragmentary plan view partly in sections showing the construction of the weather seal;

Fig. 15 is an elevation of the weather seal for use on the frame shown in Fig. 10; and Fig. 16 is a sectional view of the weather strip taken substantially along the line 16—16 of Fig. 15.

For purposes of illustration only the invention will be described in connection with the window openings for automobile doors, its use, however, around other openings will be readily apparent therefrom.

Referring particularly to Figs. 1 and 2, a one-piece molded window frame member 1, which is generally rectangular in shape, is provided with a flange 2 defining the finished wall around the opening, and an angularly disposed flange 3, integral with one edge of the flange 2, and projecting outwardly therefrom to provide a decorative finish for the said edge. The flange 3 is preferably disposed toward the interior of the vehicle and overlaps the wall 4 defining the unfinished window opening. This flange also conceals and retains the rough edges of the fabric lining, not shown, which is applied to the inner surface of the door. The flange 2, however, is directed toward the exterior of the vehicle and is substantially parallel and coextensive with the wall 4.

Projecting from the surface opposite the finished face of the flange 3 is an auxiliary flange 5 which is substantially parallel to and coextensive with the flange 2 and slightly spaced outwardly therefrom. This auxiliary flange may be continuous entirely around the frame member 1 or it may be intermittent, as desired. The purpose of the flange is first to provide a means of support for a weather sealing strip 6 and also to provide a support for the frame against the surface of the wall 4. The flanges 2 and 5 terminate in end surfaces 8 and 9, respectively, which are molded to the desired shape in accordance with the abutting complementary surfaces of the weather sealing strip 6.

It will be noted that the cross section of the frame is generally angular in shape with the flanges 2 and 5 extending substantially at right angles to the flange 3. This particular design of cross section can be readily molded in a simple two-section molding apparatus, wherein the cavity surface of one section defines the finished outer surface of the frame member and the other section defines the concealed inner surface of the frame member.

The weather sealing strip 6 shown in Fig. 2 represents only one of many different possible forms. The details of construction of each form of strip, however, are the same in principle and the basic features will subsequently be described. For the present it is only necessary to note that the strip is sufficiently flexible to be bent by the hands to the desired shape of the frame on which it is to be mounted, that it is sufficiently rigid so as to be easily mounted on the edge of the frame member and that it mutually and resiliently engages the frame member and the surface of a window glass 10 to form an efficient weather seal therebetween.

In the form illustrated in Fig. 2 the strip is provided with enlarged beads along the edges which are spaced apart a distance substantially equal to the distance between flanges 2 and 5 and the surface of the beads is complementary to the surfaces 8 and 9. Thus when the beaded edges of the strip 6 are held against the surfaces 8 and 9 an airtight seal is formed therebetween.

One means by which the strip may be held in proper position against the frame is indicated by an angle 15 having one of its flanges 16 attached to and extending parallel with the flange 5 and the other flange 17 directed at substantially right angles thereto and extending in a direction toward the flange 2. The angle 15 may be held in mounted position on the frame by a screw 18 which passes through an opening in the flange 5 and engages with a threaded opening into the flange 16. The weather strip 6 may be mounted on the angle 15 by means of a screw 20 which passes through an opening in the weather strip intermediate the spaced beads and engages a threaded opening in the flange 17. These screws 20 hold the weather strip 6 against the frame with a pressure sufficient to produce an airtight seal around the surfaces 8 and 9.

Mounted on the outside surface of the weather strip 6 and disposed between the spaced beaded portions is a strip of fabric material 22 having a napped surface 23 projecting outwardly from the weather strip 6. The fabric strip 22 may be glued or otherwise secured to the weather strip so as to provide a continuous band entirely around the frame member. The nap 23 resiliently engages the inside surface of the window glass 10 which may or may not be movable with respect to the window opening.

After the weather strip has been mounted on the frame, as described above, the entire assembly may be positioned around the unfinished wall 4 of the rough window opening from the inside surface of the door or body and secured in proper position as by means of screws which pass through the flanges 2 and 5 and are threaded into the wall 4.

A modification of the cross section of the frame and the means of mounting the weather strip thereto is shown in Fig. 3 wherein the flange 2a, similar to the flange 2 in the above described form, is directed outwardly of the vehicle toward the surface of the window glass 10 and the flange 3a is attached to the inside edge of the flange 2a and extends at right angles thereto in a direction away from the surface of the flange 2a and substantially parallel to the surface of the glass 10. Integral with the flange 3a and projecting toward the glass 10 is a short flange 27 which serves to support the frame in proper position against the wall 4 of the unfinished window opening. The weather strip 6a which, in the present instance, is shown provided with a single bead on one edge, is mounted on the frame so that the surface of the bead rests against a cooperating surface 8a formed along the outside edge of the flange 2a so as to provide a seal between the weather strip and the frame member.

To mount the weather strip 6a on the frame an angle 15a is provided having a flange 16a which engages the under face of the flange 2a and another flange 17a directed at right angles thereto which extends in a direction away from the flange 2a. The flange 16a is secured to the flange 2a by means of a thermoplastic button 29, a reduced portion of which passes through a suitable opening in the flange and is secured to the under surface of the flange 2a by means of acetone or some other suitable adhesive. The enlarged or head portion of the button overlies the opening and provides a rigid attachment for the entire angle 15a to the flange 2a. The weather strip 6a may then be mounted on the flange 17a by means of the screw 20 as described in the preceding form.

The fabric strip 22 carrying the nap 23 is disposed on the outside surface of the weather strip 6a so that when the assembled frame is in the proper position with respect to the unfinished wall 4 of the window opening, the nap 23 rests against the surface of the window glass 10 to provide an air-tight seal between the glass and the frame member.

Another modification of the frame and weather sealing structure is shown in Fig. 4, wherein the flanges 2b and 3b are disposed in substantially the same angular relation as the corresponding flanges in the foregoing forms. In the present instance, however, a protuberance 30, which is preferably in the form of a lug having a flat end surface 31, projects from the concealed face of the flange 3b toward the glass 10. A plurality of these lugs may be provided in spaced relation around the entire frame member. The weather strip 6b may be attached to the frame by means of a thermoplastic rivet 32 which is provided with a head on one end with a reduced shank portion projecting through a suitable opening in the weather strip and into an opening in the end of the protuberance 30. This rivet may be secured in place by applying an adhesive medium to the surface of the shank prior to the insertion thereof into the opening in the protuberance. The bead on the edge of the weather strip 6b lies against a surface 8b on the outside edge of the flange 2b so that an airtight seal is produced therebetween.

The fabric strip and nap assembly is disposed toward the outside of the vehicle so that the nap 23 resiliently engages the surface of the window glass 10 when the frame is in the proper mounted position with respect to the surfaces 4 of the unfinished window opening.

A still further modification is illustrated in Fig. 5 wherein the frame comprises flanges 2c and 3c and an auxiliary flange 34. The flange 34 is molded integral with the flange 3c and extends substantially parallel to and coextensive with the flange 2c. The surfaces between the flanges 34 and 2c provide a continuous passage around the frame which is designed to accommodate a rubber insert 35. This insert may be in the form of a continuous loop or a strip with the ends disposed in abutting relation to each other. An airtight seal is formed between the surface of the rubber strip 35 and the inside walls of the flanges 2c and 34 by the expansion of the rubber strip against these flanges after it has been inserted in position.

Extending beyond the outside edge of the flange 34 is a tongue 36 which is made integral with the rubber strip 35. This tongue is designed to engage the surface of the window glass and assist in forming an airtight seal between the glass and the frame.

In addition to this tongue 36 is a fabric member 22c with the nap 23 attached thereto, the fabric being mounted directly onto the rubber strip while the rubber is still plastic. A portion of the fabric member 22c lies between the flanges 2c and the rubber strip 35. In this manner a double seal is provided between the glass and the frame to exclude the entrance of any air from the exterior of the vehicle.

The structures shown in Figs. 10 to 16, inclusive, illustrate a further modification of the invention, the particular differences residing in the shape of weather seal employed with the frame structure. In the present instance, the molded frame structure is substantially identical with that shown in Figs. 1, 2, 6 and 7. The specific purpose of the modification is for the use in connection with the sliding windows on automobile vehicles. The weather strip is applied to the frame so as to provide a channel shaped section part-way around the frame so a seal may be formed around the marginal edges of the glass.

The weather strip comprises a pair of spaced parallel wires 40 with a plurality of transverse sheet metal members 41 attached at their ends to the wires by a suitable crimping operation. These sheet metal members are preferably uniformly spaced along the wires and the entire assemblage is then covered with a thin coating of rubber 42, which may be applied in sheet form and vulcanized or may be applied by drawing the assembly through a suitable extruding die and applying the rubber thereto in the plastic state. This weather sealing strip is preferably made in a flat sheet-like form which may subsequently be bent to the desired shape. Mounted on one face of the strip are a plurality of spaced parallel ribbons 43 of fabric material which has a nap 44 on the outside surface, as shown in Fig. 12.

The flat weather strip may be bent in the form of a channel shown in Fig. 13 so that the nap 44 lies on the inner faces of the channel. This channel shaped strip may then be placed along one edge of the frame member in a manner similar to that disclosed in connection with Fig. 2. It should be noted, however, that a portion of this channel-shaped strip is removed along the lower edge of the frame to allow the glass in the window to be moved to open or closed position. This is clearly shown in Fig. 15, where the portion 45 of the weather seal contains only a part of the weather strip which is attached directly to one edge of the frame. The upper portion 46, however, is channel-shaped in cross section, and the nap 44 engages portions of both sides as well as the edge of the window glass when the glass is in closed position, as indicated in Fig. 11.

It will also be noted that by reason of the construction of the weather seal a strip of this material which is in the shape of a channel may be readily formed by hand to fit the desired contour because the metal reinforcing strips 41 are spaced from each other and provide for relative movement therebetween during the shaping of the channel.

From the above description, it will be seen that a novel combination of a thermoplastic window frame which may be produced at low cost requiring no subsequent forming, welding or painting operations, and which will remain attractive in appearance over long periods of time with an efficient sealing medium between the window glass and the frame has been provided.

Although a limited number of forms of this invention are herein shown and described, it will be apparent that other forms may be made without departing from the spirit and scope of the invention as defined in the appended claims.

Having thus described my invention, I claim:

1. The combination with a decorative trim member for a glass covered window opening comprising a unitary molded member of organic plastic material in the form of a closed frame of substantially the size and shape of the walls which define the window opening, said frame including spaced flanges generally parallel to each other and extending around the entire frame and having their corresponding terminal edges disposed closely to the surface of a window glass, of a weather strip member mounted on said frame and bridging across the said terminal edges of the flanges and extending around the entire frame, and resilient fabric means mounted on the weather strip member for yieldably engaging the surface of the window glass to provide a seal between the glass and the weather strip member.

2. In an automobile vehicle having a window opening and a window panel movable in a guided path across said opening, the combination with a decorative, peripherally closed, unitary finished frame member of molded organic plastic material and comprising spaced flanges overlying the walls of the window opening and extending generally parallel with each other toward the window panel and entirely around the frame, the corresponding terminal edges of said spaced flanges lying a short distance from the plane of the window panel, and another flange disposed substantially at right angles to the spaced flanges and integrally attached thereto along the opposite edges from the terminal edges and extending outwardly from the limits of the window opening, of a weather sealing member attached to the frame member and engaging said terminal edges, said sealing member extending entirely around the frame member and having a portion thereof generally channel-shaped in cross section which extends part way around the window frame so as to engage the marginal portions of opposite surfaces of the window panel, and the remainder of the weather sealing member having only one wall of the channel-shaped section which extends the rest of the way around the frame member and engaging the marginal portion of only one surface of the window frame.

3. The combination with a decorative trim member of thermally moldable organic material having inner and outer flanges adapted to extend with their major faces substantially in parallel relationship to an edge portion of a window opening, relatively wide edge surfaces on said flanges, a flexible sealing strip supported with its marginal portions on respective relatively wide edge surfaces, and means secured to one of the flanges and adapted to secure the strip in place.

4. A window trim construction for glass covered windows of the type described, comprising a frame member of moldable organic plastic material having a flange adapted to extend in peripherally overlying relation to the edge of an opening in a wall and another flange adapted to extend along the wall outwardly from the limits of the opening, a metal member secured to the first mentioned flange, and having a portion extending free from said flange, a flexible sealing strip with means thereon for engagement with the window glass, said strip being secured to the free portion of the metal member, the metal member having an aperture therein, and the attaching means for the metal member comprising an organic plastic device with a relatively reduced portion extending through the aperture and cemented to the organic plastic of the frame member.

JAMES S. REID.